(12) United States Patent
Pochapsky (10) Patent No.: US 8,094,309 B1
(45) Date of Patent: Jan. 10, 2012

(54) LINE OF SIGHT ADJUSTMENT METHOD FOR OPTICAL SYSTEMS

(75) Inventor: Eugene J. Pochapsky, Cheswick, PA (US)

(73) Assignee: Omnitech Partners, Inc., Freeport, PA (US)

( * ) Notice: Subject to any disclaimer, the term of this patent is extended or adjusted under 35 U.S.C. 154(b) by 0 days.

(21) Appl. No.: 12/685,552

(22) Filed: Jan. 11, 2010

Related U.S. Application Data (63) Continuation of application No. 12/462,668, filed on Aug. 7, 2009, now abandoned.

(60) Provisional application No. 61/188,205, filed on Aug. 7, 2008.

(51) Int. Cl.
*G01B 11/00* (2006.01)

(52) U.S. Cl. ............ 356/399; 356/400; 356/247; 356/7; 356/8; 356/9

(58) Field of Classification Search .......... 356/247–253, 356/153, 7, 8, 9, 399, 400, 138; 359/399, 359/831, 353–355
See application file for complete search history.

(56) References Cited

U.S. PATENT DOCUMENTS

| | | | | | |
|---|---|---|---|---|---|
| 3,359,849 | A | * | 12/1967 | Friedman ...................... | 356/153 |
| 3,942,862 | A | * | 3/1976 | Furukawa et al. ............ | 359/557 |
| 5,073,017 | A | * | 12/1991 | Suda ............................. | 359/557 |
| 6,157,405 | A | * | 12/2000 | Momochi ................. | 348/208.8 |
| 6,992,843 | B2 | | 1/2006 | Juhala | |
| 7,142,357 | B2 | | 11/2006 | Greenslade | |
| 7,359,114 | B2 | | 4/2008 | Sauter et al. | |

* cited by examiner

*Primary Examiner* — Layla Lauchman
(74) *Attorney, Agent, or Firm* — Robert D. McCutcheon (57) ABSTRACT

A line of sight adjustment device (LSAD) employs a simple yet robust structure and method to adjust the line of sight (or boresight) of a telescope, clip-on night sight, night vision sight, day scope, or other optical sighting device. In one embodiment, the LSAD includes a single optical element adjusted to change the apparent viewing angle to a target viewed through the device without degrading the optical quality of the image.

20 Claims, 5 Drawing Sheets

LINE OF SIGHT ADJUSTMENT METHOD FOR OPTICAL SYSTEMS

CROSS-REFERENCE TO RELATED APPLICATION

This application is a continuation of prior application Ser. No. 12/462,668 filed on Aug. 7, 2009 now abandoned, which claims priority under 35 U.S.C. §119(e) to U.S. Provisional Patent Application No. 61/188,205 filed on Aug. 7, 2008, which is are hereby incorporated by reference.

TECHNICAL FIELD

The present invention relates generally to optical systems, and more particularly to an adjustable line of sight device in an optical sighting device.

BACKGROUND

An operator of a viewing device may desire to adjust a line of sight while observing a scene through the viewing device. Many viewing devices may be adjusted so as to apply a specific angle of deviation to the image as viewed by the operator. For example, the impact point of a projectile as viewed by a day scope may be adjusted in angle so that it appears to be at the point designated by the day scope's reticle. The amount of adjustment changes when the day scope is used at different target ranges, or when the day scope is moved from one weapon to another. As another example, a clip-on night sight may be adjusted in the factory such that the apparent angular position of a point in the image as viewed by the sight is the same as that point's angular position in the output of the sight.

Certain types of sights have both day-vision and night-vision capability, and are referred to herein as "night-day sights." Night vision capability is provided by a night-vision optical system, referred to hereinafter as "night optics." Likewise, the day-vision capability is provided by a day-vision optical system, referred to hereinafter as "day optics." Because night optics has different imaging capabilities than day optics and includes a night vision sensor, such as an image intensifier or thermal imaging sensor, the optical design of the night optics is different than the day optics. Accordingly, the night optics and the day optics are typically separate optical systems, even when combined in the same housing.

An adjustable wedge-prism assembly is disclosed in U.S. Pat. No. 7,142,357 (the '357 patent) to Greenslade, titled "Night-Day Boresight with Adjustable Wedge-Prism Assembly," which is incorporated herein by reference. A boresight alignment device is disclosed in U.S. Pat. No. 7,359,114 (the '114 patent) to Sauter, et al., titled "Clip-On Night Vision Device," which is incorporated herein by reference. The prior art methods and structures described in the '357 and '114 patents introduce appreciable degradation into the system, add considerably to the overall length and weight of the system, and/or require the complicated, non-intuitive rotation of multiple prisms or tilting groups of optical elements to accomplish alignment. These shortcomings may be unacceptable to an operator of the viewing device.

Accordingly, there is a need in the art for an improved line of sight adjustment device for use in an optical sighting device.

SUMMARY

In accordance with one embodiment, there is provided a line of sight adjustment device (LSAD) for use in an optical sighting device. The LSAD includes an optical system having at least one optical element. The LSAD also includes an alignment element that is configured to align light rays transmitted from the optical system. The LSAD further includes an element frame in contact with the alignment element. The LSAD still further includes an alignment adjustment mechanism configured to adjust a position of the alignment element.

In accordance with another embodiment, there is provided a method for adjusting a line of sight of an optical sighting device. The method includes providing an optical system having at least one optical element. The method also includes providing alignment element configured to align light rays transmitted from the optical system. The method further includes providing an element frame that is in contact with the alignment element. The method still further includes adjusting a position of the alignment element with an alignment adjustment mechanism.

In yet another embodiment, there is provided an optical sighting device having a line of sight adjustment device (LSAD). The LSAD includes an optical system having at least one optical element. The LSAD also includes an alignment element configured to align light rays transmitted from the optical system. The LSAD further includes an element frame in contact with the alignment element. The LSAD still further includes an alignment adjustment mechanism configured to adjust a position of the alignment element.

Other technical features may be readily apparent to one skilled in the art from the following figures, descriptions, and claims.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

The present disclosure describes a line of sight adjustment device (LSAD) that functions to adjust a line of sight (also referred to by the term "boresight") of an optical device. Such devices are usually employed by a technician or by a user of the optical device. One embodiment of the disclosure utilizes a single optical element without rotating prisms or degradation to the quality of the image transmitted by the LSAD. The LSAD may be used in or with a variety of optical devices including handheld night vision devices, weapon or helmet mounted night vision devices, day/night sighting devices, dedicated weapon sighting devices, clip-on augmentation devices, telescopes, and any other optical sighting devices where a line of sight adjustment is helpful or desired.

The methods and structures described herein may be employed, or substituted in place of one or more components, in specific structure(s) (or similar structure(s)) described in the '357 and '114 patents. For example, FIG. 2 of the '357 patent is reproduced in part herein as FIG. 6, and a line of sight adjustment device according to the present disclosure may be substituted in place of the adjustable wedge-prism assembly 200 in the '357 patent.

Figure 1:
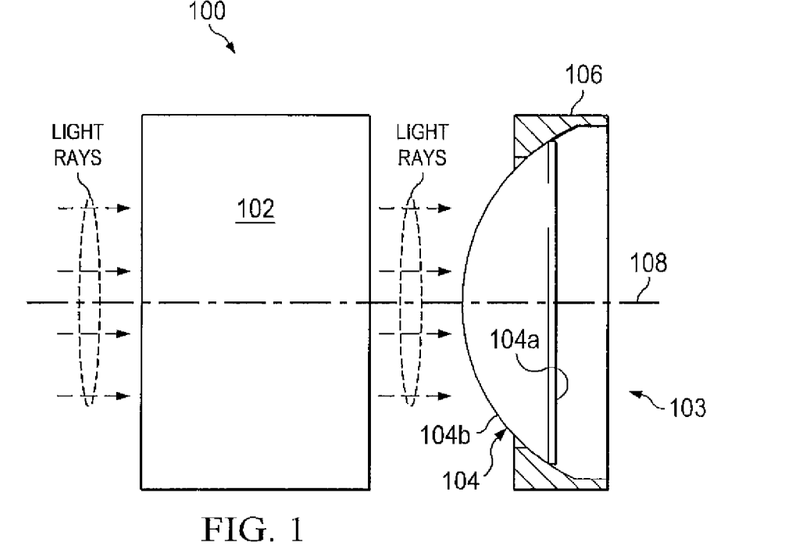
FIG. 1 illustrates a system for adjusting a line of sight in accordance with one embodiment of the present disclosure.

FIG. 1 illustrates a system 100 for adjusting a line of sight in accordance with one embodiment. The system 100 includes all or a portion of an optical system 102 and an LSAD 103. The LSAD 103 includes an alignment element 104 and an element frame or housing 106. Within the LSAD 103, the alignment element 104 is moveably seated or mounted within the element frame 106. The LSAD 103 is positioned between the optical system 102 and a viewer, and functions to adjust a line of sight without significant optical degradation. The optical system 102 includes one or more optical elements that may include one or more lenses for magnifying or otherwise processing an image of an object.

In the embodiment shown in FIG. 1, the alignment element 104 is substantially aligned with a common axis 108 of the optical system 102, while the element frame 106 is substantially fixed relative to the axis 108 and the optical system 102. In other words, the element frame 106 is fixed and the position of the alignment element 104 relative thereto may be adjusted (i.e., moveably adjustable in relation to the element frame 106). In the specific embodiment shown, the alignment element 104 is structured to include a planar surface 104*a* and a curved or spherical surface 104*b*. The planar surface 104*a* is positioned distal, while the surface 104*b* is positioned proximate, to the optical system 102. Different shapes or structures may be utilized for the alignment element 104, as long as the shape or structure chosen provides the desired functionality. For example, element 104 may be cylindrical in shape as long as the optical system 102 is designed to interface (optically) with such a structure. Generally, the optical properties of the optical system 102 and the alignment element 104 are selected so that light propagating within the interior of the alignment element 104 is collimated. As will be understood, the alignment element 104 converts non-collimated light into collimated light. Thus, when the optical input to the alignment element 104 is non-collimated light (image) the optical output is collimated light (image). In another embodiment, the alignment element 104 may received as the input collimated light and will also output collimated light.

It will be understood that the term "planar" may also refer to or include some degree of nonplanarity, such as "nearly" or "substantially" planar, and the term "planar" therefore also refers to such planarity. Similarly, the term "collimated" may also refer to or include some degree of non-collimated light, such as nearly or substantially collimated, and the term "collimated" therefore also refers to such collimation. Therefore, the level or degree of planarity or collimation that falls within the terms "planar" and "collimated", respectfully, is determined by the acceptable level of optical aberrations introduced into the optical system when the alignment element 104 is adjusted/tilted. For example, the optical output of a specific realization of the LSAD 103 configured in FIG. 1 may not be perfectly collimated, but instead may appear to focus at a fixed distance proximate (or distal) to the LSAD 103. In such an instance, tilting the alignment element 104 introduces optical aberrations into the optical output of the LSAD 103. These aberrations will be in proportion to the magnitude of the tilt and inversely proportional to the magnitude of the proximate (or distal) focus distance. Since aberrations are present in any real optical system, and such optical systems are designed and built to maintain these aberrations within an acceptable level for the application, the case where the LSAD is operating in non-collimated light at its distal surface will provide acceptable performance if the magnitude of the tilt of alignment element 104 and the inverse magnitude of the proximate or distal focus distance are limited to maintain the sum of all optical aberrations within the acceptable level for the application.

In certain embodiments, such as the embodiment shown in FIG. 1, the optical system 102 and the alignment element 104 are separated by an effective space. This effective space introduces at least some optical power to the system. The amount of optical power depends on the spacing and materials between the spacing. In an alternate embodiment, the alignment element 104 may be in physical contact with at least one optical element of the optical system 102. Tn some embodiments, the alignment element 104 may be positioned between or among optical elements within the optical system 102.

In the specific embodiment shown in FIG. 1, the LSAD 103 is positioned to receive an image or light rays from optical system 102. In other embodiments, the LSAD 103 may be positioned in front of the optical system 102 and output the line of sight adjusted image (or light rays) to the optical system 102, and in this embodiment, the LSAD 103 would be reversed (from that shown in FIG. 1), such that the planar surface 104*a* is positioned distally from the optical system 102. In still other embodiments, the LSAD 103 may be positioned at a point within the optical system 102 itself where the functioning (tilting, adjustment) of the alignment element 104 does not increase system optical aberrations to the point where system performance is unacceptable. For example, the LSAD 103 may be positioned at any point within the optical system 102 where the planar surface 104*a* of the alignment element 104 is capable of transmitting collimated light.

In the embodiment shown in FIG. 1, the alignment element 104 is a plano-convex lens structure. In other embodiments, the alignment element 104 could be a plano-concave lens structure. In still other embodiments, the alignment element 104 may include more than one lens or may be fabricated from materials other than optical glass such as infrared transmitting material(s), crystal material(s), or infrared glass(es). In still other embodiments, alignment element 104 could be a vessel that holds gas, liquid or vacuum within, where the vessel material is selected to transmit the desired wavelengths, and whose wall thickness is dimensioned so that any optical aberrations introduced by the vessel are at or below an acceptable level. The determination of an acceptable level will generally depend on the design or desired requirements for a particular application or function and/or the resolution/performance of the optical system 102. In some applications, reference to a desired modulation transfer function (MTF) may be utilized.

In general, the alignment element 104 may include a single or multiple lenses of any shape or configuration whose combined effect is such that collimated light is accepted as an input or provided as an output at the planar surface 104*a*. In some embodiments, the alignment element 104 may be surrounded by a retaining ring (not shown in FIGS. 1-6), such as metal or plastic, functioning to protect the alignment element 104 and maintain its position against the element frame or housing 106.

When the alignment element 104 is rotated or tilted (i.e., moved) in relation to the element frame 106 so that the surface of the alignment element 104 remains in contact with the element frame 106, the planar surface 104a tilts with respect to the optical system 102, causing a deviation in the angle of the light exiting the optical system 102. The angle of deviation of the light is proportional to the amount of tilt imparted to the planar surface 104a of the alignment element 104 and the difference between the index of refraction of the alignment element 104 and the index of refraction of the optical media (vacuum, gas, air, liquid or movable solid) impinging upon the planar surface 104a of the alignment element 104.

Because the light propagating within the alignment element 104 is collimated, the tilt of the surface of the alignment element 104 will not result in optical aberrations (other than possible chromatic aberrations) being imparted to the transmitted light. Again, as described above, some degree of nonplanarity of the surface and/or non-collimation of the light may be present provided any resulting optical aberrations would be acceptable. Low dispersion optical materials may be used to limit the effects of chromatic aberrations that may be apparent for larger tilt angles when broadband illumination is transmitted through the alignment element 104.

In some embodiments, the optical system 102 and the alignment element 104 may operate in wavelengths of light in the visible range, in wavelength ranges other than the visible range, such as infrared, near-infrared, millimeter-wave, or ultraviolet (UV) ranges, or any combination of these.

Figure 2:
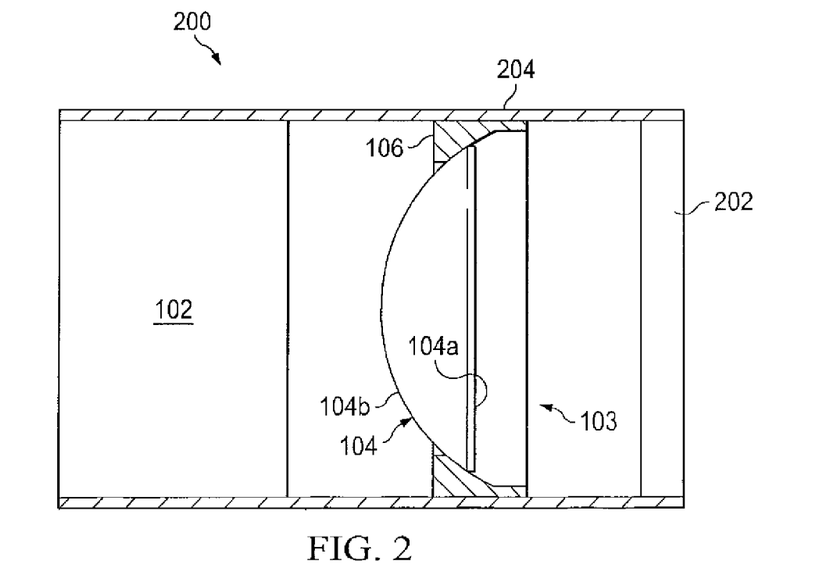
FIG. 2 illustrates a system for adjusting a line of sight in accordance with one embodiment of the present disclosure.

FIG. 2 illustrates a system 200 for adjusting a line of sight in accordance with one embodiment of the present disclosure. The system 200 is shown including the LSAD 103 at least partially integrated with the optical system 102. The system 200 further includes an environmental seal 202 and an optical system housing 204. In certain embodiments, the LSAD 103 may be exposed to the exterior environment and an environmental seal, if included, could be incorporated into the mounting assembly for the alignment element 104. In other embodiments, it may be desirable or necessary to enclose or protect the LSAD 103.

As shown in FIG. 2, the optical system 102 and the LSAD 103 are enclosed within the optical system housing 204. The optical system housing 204 is configured to contain and stabilize the optical system 102 and the LSAD 103. Thus, the LSAD 103 and the optical system 102 are rigidly affixed in relation to each other. The optical system housing 204 may also provide protection from harmful elements of the exterior environment, such as dirt, mud, dust, or liquids. The environmental seal 202 is disposed at one end of the optical system housing 204. The environmental seal 202 closes off the end of the optical system housing 204 to further protect the optical system 102 and the LSAD 103 from harmful elements in the exterior environment.

In certain embodiments, the environmental seal 202 is formed of a flat piece of clear glass or plastic. In other embodiments, the environmental seal 202 may include other materials, or possess other shapes, such as a prism or a bevel. In addition, a fixed prism (not shown) may be included and function to provide some coarse boresight correction to reduce the necessary adjustment range of the LSAD 103 (and therefore the size of the alignment element 104). An alternative embodiment of the present disclosure may include more than one environmental seal. For example, an environmental seal may also be located on the other end of the optical system housing 204 (i.e., the left end of the optical system housing 204 in FIG. 2).

Various structures and configurations may be utilized for the optical system housing 204 as will be understood by those skilled in the art. For example, the optical system housing 204 may be a cylinder or tubular shape that partially or completely surrounds the optical system 102 and the LSAD 103. The optical system housing 204 may have one or more openings (not shown) to accommodate fasteners, supports, or controls for the optical system 102 and the LSAD 103. Alternatively or additionally, the openings may accommodate one or more adjustment elements for the LSAD 103, as will be described later.

Figure 3A:
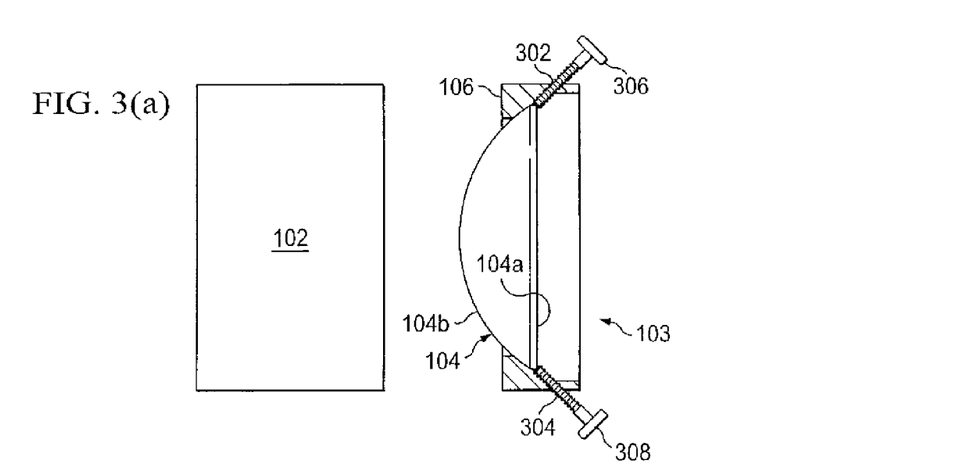
FIGS. 3(a)-3(c) illustrate a line of sight adjustment device in various orientations and a mechanism for adjusting the alignment element of the line of sight adjustment device, in accordance with one embodiment of the present disclosure.
Figure 3B:
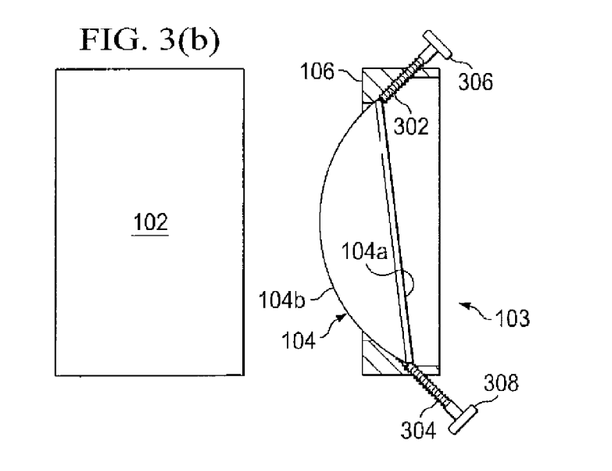
Figure 3C:
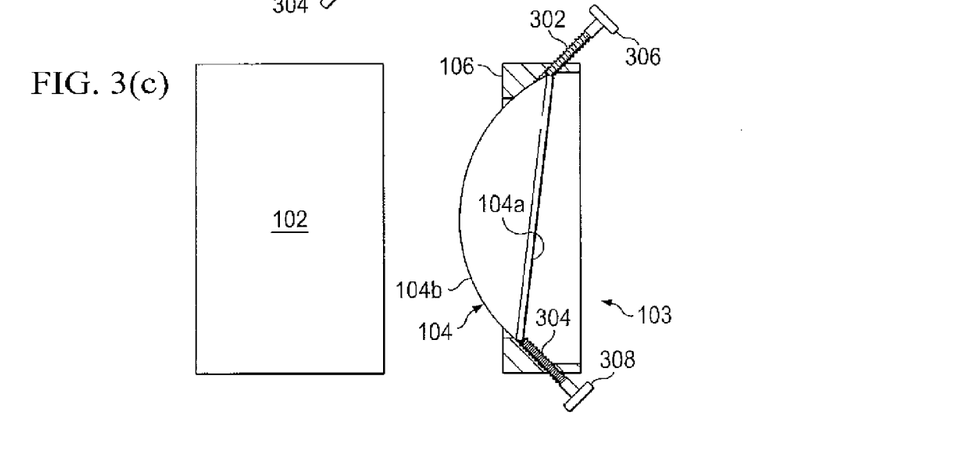

Now turning to FIGS. 3(a)-3(c), these illustrate the LSAD 103 in various orientations and a mechanism or structure for adjusting the alignment element 104 of the LSAD 103, in accordance with one embodiment of the present disclosure. Among the differences between the adjustment device disclosed in the '114 Patent and the present disclosure is that adjustment of the LSAD 103 according to the present disclosure is more intuitive to the user. Risley prisms, as disclosed in the '114 Patent, require rotation with respect to each other, first to change the amount of correction and then again to affect the direction of correction.

In contrast, adjustment of the LSAD 103 is performed in a simpler and more intuitive manner. If the user has a vertical error, he manipulates a vertical adjustment control, which adjusts the vertical position or tilt of the alignment element 103. If the user has a horizontal error, he manipulates a horizontal adjustment control, which adjusts the horizontal position or tilt of the alignment element.

In the embodiment shown in FIG. 3(a), the LSAD 103 includes vertical adjustment controls 302 and 304 that are in contact with the alignment element 104. In the embodiment shown, the vertical adjustment controls 302 and 304 are mechanical set screws that, when turned, move in or out of the element frame 106. Each of the vertical adjustment controls 302 and 304 may include a knob, shown in FIG. 3(a) as knobs 306 and 308, to manually turn the vertical adjustment controls 302 and 304.

Movement of the vertical adjustment controls 302 and 304 results in an adjustment of the vertical position or tilt of the alignment element 104. For example, in FIG. 3(a), the alignment element 104 is disposed or seated in the LSAD 103 in an unadjusted position. In FIG. 3(b), the vertical adjustment control 302 has been advanced further into the element frame 106, and the vertical adjustment control 304 has been advanced out from the element frame 106. These adjustments cause the alignment element 104 to tilt downward with respect to the LSAD 103 and the optical system 102. Conversely, in FIG. 3(c), the vertical adjustment control 302 has been advanced out from the element frame 106, and the vertical adjustment control 304 has been advanced into the element frame 106. These adjustments cause the alignment element 104 to tilt upward with respect to the LSAD 103 and the optical system 102. An adjustment of the tilt of the alignment element 104 causes a change or correction in the view through the LSAD 103, as described in greater detail below. The reference numerals shown in FIG. 3(a) have been removed in FIGS. 3(b) and 3(c) for simplicity and clarity.

In the examples shown in FIGS. 3(a)-3(c), the LSAD 103 is shown with controls only for the vertical position of the alignment element 104. Similar control mechanisms (not shown) are provided for the LSAD 103 in order to adjust the horizontal position of the alignment element 104. For example, the alignment element 104 might be in contact with adjustment controls (not shown) disposed on the left and right sides of the element frame 106. Such horizontal adjustment controls could be similar or identical to the vertical adjustment controls 302 and 304, except for their position around the element frame 106.

Various changes may be made to the LSAD 103 without departing from the spirit of the disclosure. For example, the vertical adjustment control of the LSAD 103 may be accomplished with only one of the adjustment controls 302, 304. For example, the adjustment control may be provided by a set screw and a corresponding spring element (positioned opposite the set screw) or by a push-pull screw affixed (directly or indirectly) to the alignment element provides a corresponding tilting movement of the alignment element 104 as the screw is rotated in or out of its aperture. Similarly, the horizontal adjustment control of the LSAD 103 may be accomplished with only one of the adjustment controls (not shown) or as described above. Additionally or alternatively, adjustment controls may be located on diagonal axes of the LSAD 103 instead of vertical or horizontal axes. Any one or all of the adjustment controls of LSAD 103 may include a mechanism other than a set screw (or those described above), and such mechanisms would be readily known to those skilled in the art. For example, an adjustment control may include a lever, button, slide, gear, piston, or any other mechanism capable of producing movement of the alignment element 104 with respect to the frame 106 (or optical system 102). Any one or all of the adjustment controls of LSAD 103 may be operated automatically, such as by a motor or solenoid, instead of manual operation.

The alignment element 104 may be "edged" to a smaller diameter after it is adjusted in tilt so as to be only as large as is required to accommodate the light entering (or leaving) the alignment element 104. The alignment element 104 may be edge ground to final diameter. No further discussion of the edging process, as this process is understood by those skilled in the art. There is no limit other than edge thickness (and practical considerations) that restrict how large in diameter the alignment element 104 may be. The alignment element 104 may be deliberately fabricated with a wedge to provide the same effect as a much larger alignment element 104 that has been edged down to a smaller diameter after an adjustment was affected. Thus, in one embodiment, the alignment element is edged, and the edged alignment element 104 may have an original diameter larger than the diameter required to accommodate the light entering (or leaving) the alignment element 104 so as to allow further adjustments to be affected by the alignment element 104 without restricting the light passing through the element.

Figure 4A:
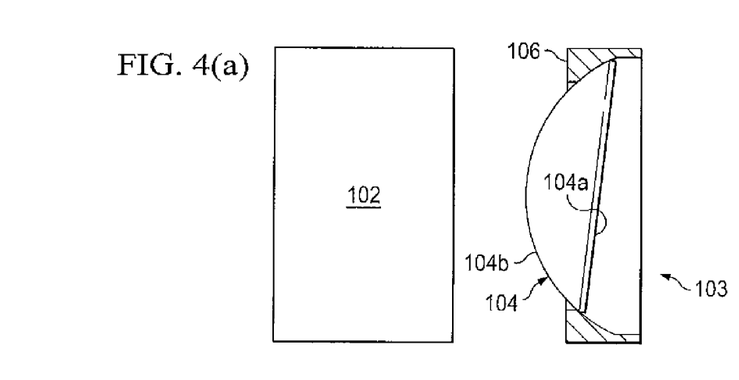
FIGS. 4(a)-4(c) illustrate deviations of light rays by a line of sight adjustment device for an image that appears to the viewer, in accordance with one embodiment of the present disclosure.
Figure 4B:
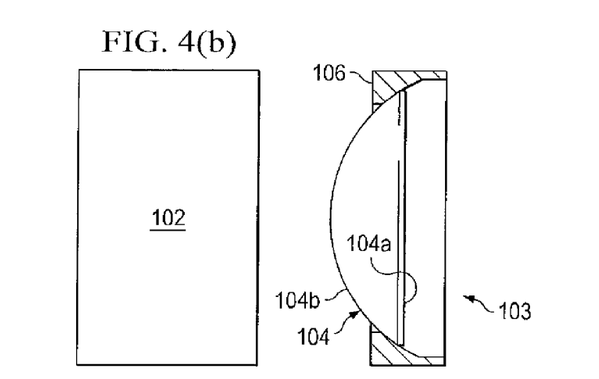
Figure 4C:
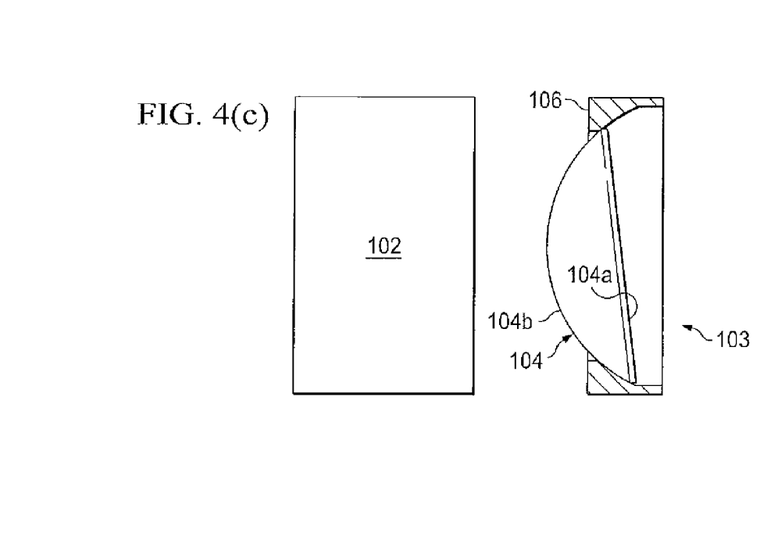

FIGS. 4(*a*)-4(*c*) illustrate deviations of light rays by the LSAD 103 for an image that appears to the viewer, in accordance with one embodiment of the present disclosure. For simplicity and clarity, the adjustment controls shown in FIGS. 3(*a*)-3(*c*) are not depicted. The different embodiments depicted in FIGS. 4(*a*)-4(*c*) show the LSAD 103 in three of an infinite number of possible positions. The index of refraction of the alignment element 104 is depicted in FIGS. 4(*a*)-4(*c*) as being greater than the index of refraction of the optical media present at the interface to the planar surface of alignment element 104.

In FIG. 4(*a*), the top of the alignment element 104 of the LSAD 103 is tilted forward (vertical adjustment). This position causes the light rays from the optical system 102 to deviate upward, and therefore makes the object appear lower to the viewer. It will be understood that the light would deviate downward in FIG. 4(*a*) if the index of refraction of the alignment element 104 was less than that of the optical media at its planar surface.

In FIG. 4(*b*), the alignment element 104 is untilted or unadjusted. This position causes no deviation in the light rays output from the optical system 102.

In FIG. 4(*c*), the top of the alignment element 104 is tilted backwards. This position causes the light rays from the optical system 102 to deviate downward, and therefore makes the object appear higher to the viewer. The movement of the alignment element 104 against the element frame 106 may occur in any direction (up, down, left, right, or any combination thereof). Thus, the LSAD 103 can cause the object viewed to appear higher, lower, to the left of, or the right of its original orientation depending upon the position of the alignment element 104 with respect to the element frame 106.

Figure 5:
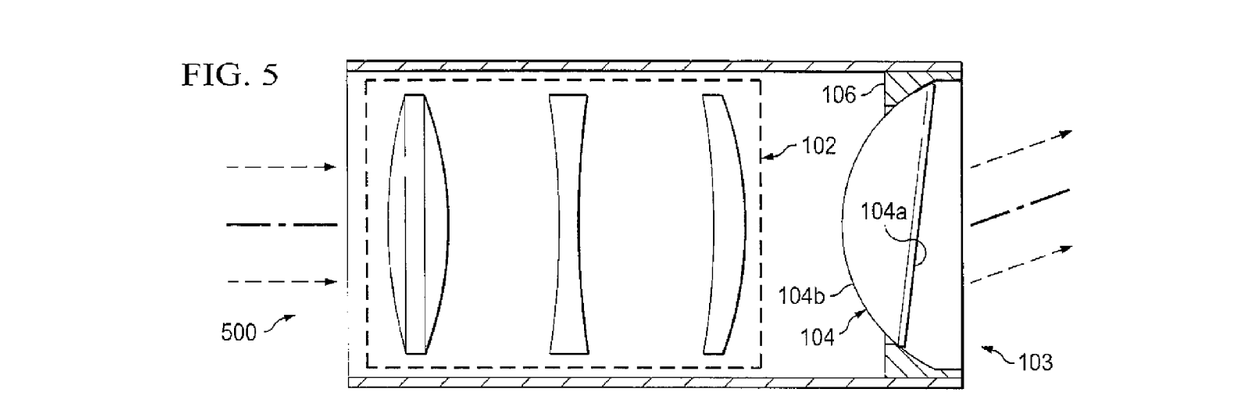
FIG. 5 illustrates a line of sight adjustment device installed with components of an optical system, in accordance with one embodiment of the present disclosure.

FIG. 5 illustrates the LSAD 103 in relation to various components of the optical system 102, in accordance with one embodiment of the present disclosure. The system 500 includes the LSAD 103 and an exemplary embodiment of optical system 102. The exemplary optical system 102 is shown in FIG. 5 as three lenses; however more or fewer lenses are possible. As in FIG. 4(*a*), the alignment element 104 of LSAD 103 is tilted upward. This position causes the light rays from the optical system 102 to deviate upward, and therefore makes the object appear lower to the viewer.

The integration of the LSAD 103 within the optical system 102, as shown in this embodiment, enables the LSAD 103 to be included at the time of manufacture of the optical system 102. This is in contrast to the prior art adjustment devices of the '357 and '114 patents. The prior art adjustment devices typically include components that are added on to an existing optical system. The additional components result in additional complexity, parts, and cost to an optical system.

Figure 6:
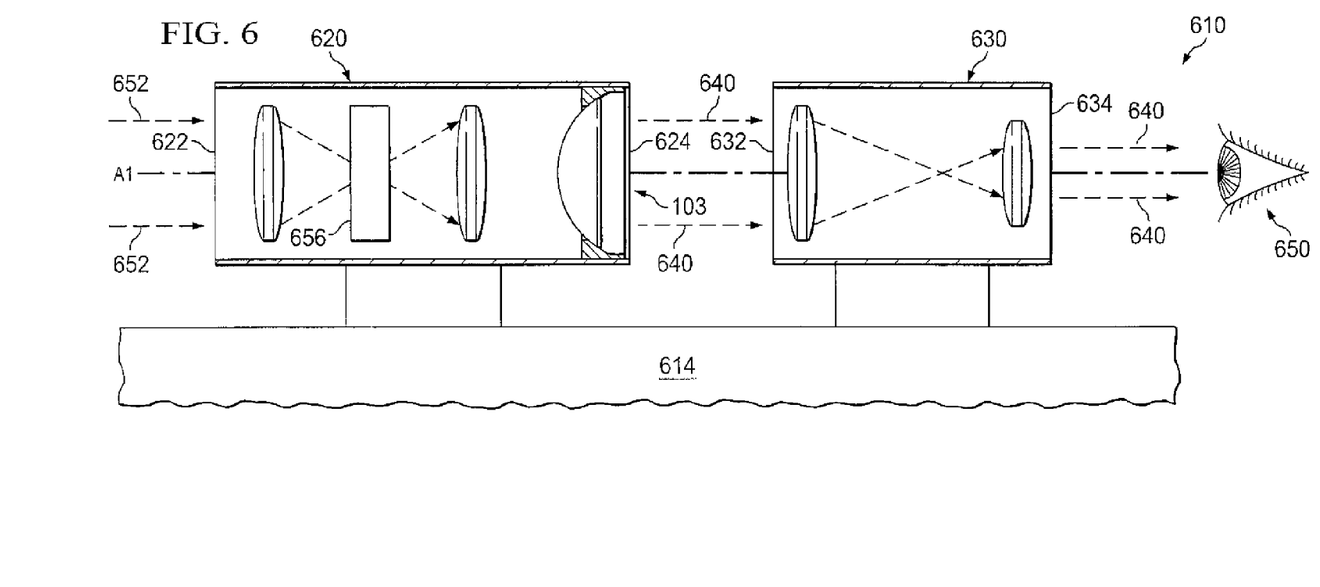
FIG. 6 depicts a schematic diagram of an in-line night-day boresight including a line of sight adjustment device, in accordance with one embodiment of the present disclosure.

FIG. 6 reproduces part of FIG. 2 of the '357 patent. The LSAD 103 according to the present disclosure is disposed in place of the adjustable wedge-prism assembly 200 of the '357 patent. FIG. 6 depicts a schematic diagram of an in-line night-day boresight 610 shown mounted to a platform, such as a weapon barrel 614. The boresight 610 includes removable night optics 620 having an input end 622 and an output end 624. The night optics 620 is arranged upstream of and in line with day optics 630 for nighttime viewing and is removed for daytime viewing. The day optics 630 has an input end 632 adjacent the night optics output end 624, and an output end 634 opposite the input end 632. The night optics 620 and the day optics 630 are arranged along an optical axis A1. A user 650 is shown viewing through the boresight at the output end 634 of the day optics 630.

In the operation of the boresight 610, light 652 from a distant target (not shown) enters the input end 622 of the night optics 620 and is incident an image intensifier tube 656, which outputs intensified (amplified) light 640. The intensified light 640 is then passed through the LSAD 103, where an alignment adjustment can be made if needed. The intensified light 640 is then relayed to the input end 632 of the day optics 630 and is relayed to the output end 634 to be viewed by the user 650.

While the night optics 620 is designed for use in combination with the day optics 630, manufacturing errors (e.g., mechanical misalignments and tolerance errors) in the night optics 620 may cause light 640 to misalign with respect to the input end 632 of the day optics 630. This image shift typically corresponds to an angular error of about ten to fifteen minutes (10'-15') of arc. Adjustment of the alignment element 104 in the LSAD 103 can correct the misalignment. Different component manufacturing errors can result in larger alignment errors. These errors may be corrected by increasing the diameter and adjustment range of the LSAD 103/alignment element 104, or by fabricating the device/element with a wedge (as previously described) to remove the larger error and allow for fine adjustment by the LSAD 103 adjustment, or by increasing the curvature of the curved surface 104b so as to increase the range of the tilt angle for a given diameter.

Figure 7:
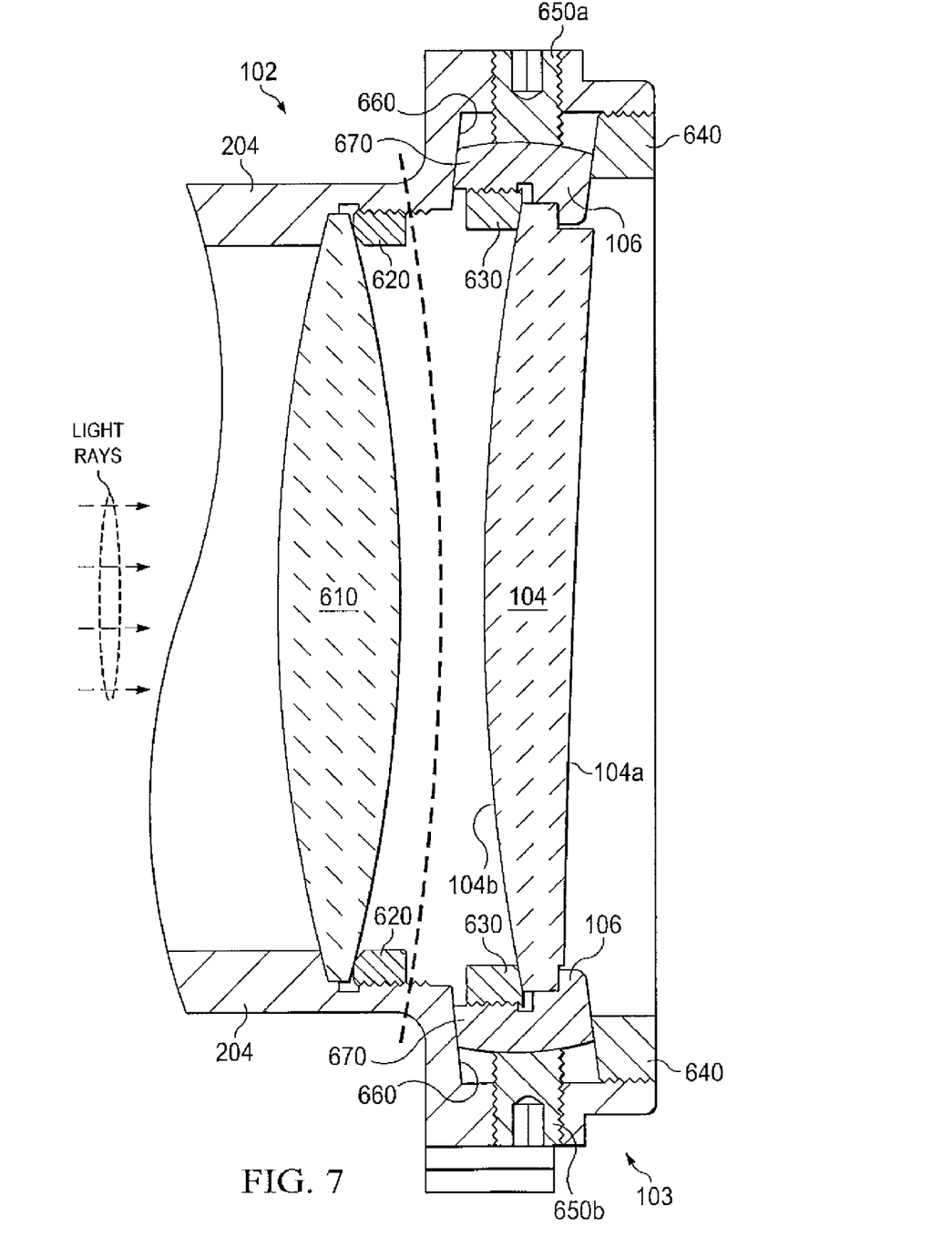
FIG. 7 is a cross-sectional view of an alternative embodiment of the line of sight adjustment device shown installed with one or more components of an optical system.

Now referring to FIG. 7, there is shown an alternative embodiment of the LSAD 103 shown in combination with at least a portion of the optical system 102. FIG. 7 includes a dotted line that conceptually divides the optical system 102 from the LSAD 103. As illustrated in this embodiment, the optical system 102 and the LSAD 103 are shown as integrated through the inclusion of the optical system housing 204.

The optical system 102 includes a biconcave lens element 610 secured within the housing 204 by a retaining ring 620. As will be appreciated, the optical system 102 may include additional elements and structures, which have been omitted for clarity.

The LSAD 103 includes the alignment element 104 and the alignment element frame 106 (may be called a "carrier"). The alignment element 104 is shown spaced apart from the lens element 610 of the optical system 102 by a predetermined distance that translates into a give optical power. A retaining ring 630 secures the alignment element 104 to the frame 106, and a retaining ring 640 secures the frame 106 (with alignment element 104) within the housing 204. As understood, structures other than retaining rings may be used to secure the lens element 610, the alignment element 104 and/or the frame 106, as described. In the embodiment illustrated, the alignment element 104 is an edged alignment element, but could also be a conventionally formed (non-edged).

The housing 204 includes one or more apertures each for receiving an adjustment mechanism or adjustment control 650a, 650b which are operable for adjusting a tilt of the alignment element 104. The functionality resulting from the controls 650a, 650b are the same or similar to the controls 302, 304. Similarly, additional controls (not shown) may be utilized for horizontal tilt. As will be understood, movement of the control(s) 650a, 650b result in a corresponding adjustment (tilt) of the alignment element 104 and the frame 106. As described with respect to controls 302, 304, in other embodiments, other structures and methods can provide the adjustment mechanism(s).

With reference to FIG. 7, the housing 204 includes an angled shoulder or surface 660 that receives a similarly angled surface 670 of the frame 106. It can be seen that as the frame 106 is moved up or down by the screw(s) 650a, 650b, the frame 106 and hence, the alignment element 104, tilts to adjust the line of sight. Thus, as the frame 106 moves downward, the upper portion of the frame 106 moves laterally in one direction (to the left) while the bottom portion moves laterally in the opposite direction (to the right).

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A line of sight adjustment device (LSAD) for use in an optical sighting device, comprising:
   an alignment element configured to align light rays transmitted from an optical system;
   an element frame in contact with the alignment element; and
   an alignment adjustment mechanism configured to adjust a position of the alignment element,
   wherein the alignment adjustment mechanism includes a manually operable control configured to adjust the position of the alignment element.

2. The LSAD as set forth in claim 1, wherein the alignment element is a plano-convex lens.

3. The LSAD as set forth in claim 2, wherein a planar side of the alignment element faces away from the optical system and a spherical side of the alignment element faces toward the optical system.

4. The LSAD as set forth in claim 1, wherein the alignment element is a plano-concave lens.

5. The LSAD as set forth in claim 1, wherein the manually operable control comprises at least one set screw.

6. The LSAD as set forth in claim 5, wherein each of the at least one set screw has a knob at one end, the knob configured to allow a user to rotate the set screw to adjust the alignment element.

7. The LSAD as set forth in claim 1, the LSAD further comprising:
   an optical system housing that surrounds the alignment element; and
   at least one environmental seal that closes off one end of the optical system housing.

8. The LSAD as set forth in claim 1, wherein the adjustment element is configured to tilt in a horizontal direction and a vertical direction.

9. The LSAD as set forth in claim 1, wherein the LSAD is configured to allow a user of the optical sighting device to actuate the manually operable control to change an apparent viewing angle to a target viewed through the LSAD.

10. A method for adjusting a line of sight of an optical sighting device, comprising:
    providing an alignment element configured to align light rays transmitted from an optical system;
    providing an element frame that is in contact with the alignment element; and
    providing an alignment adjustment mechanism configured to adjust a position of the alignment element, wherein the alignment adjustment mechanism includes a manually operable control configured to adjust the position of the alignment element.

11. The method as set forth in claim 10, wherein the alignment element is a plano-convex lens.

12. The method as set forth in claim 11, wherein a planar side of the alignment element faces away from the optical system and a spherical side of the alignment element faces toward the optical system.

13. The method as set forth in claim 10, wherein the manually operable control comprises at least one set screw.

14. The method as set forth in claim 13, wherein each of the at least one set screw has a knob at one end, the knob configured to allow a user to rotate the set screw to adjust the alignment element.

15. The method as set forth in claim 10, wherein the adjustment element is configured to tilt in a horizontal direction and a vertical direction.

16. An optical sighting device having a line of sight adjustment device (LSAD), the LSAD comprising:

an alignment element configured to align light rays transmitted from the optical system;

an element frame in contact with the alignment element; and an alignment adjustment mechanism configured to adjust a position of the alignment element, wherein the alignment adjustment mechanism includes a manually operable control configured to adjust the position of the alignment element.

17. The optical sighting device as set forth in claim 16, wherein the alignment element is a plano-convex lens.

18. The optical sighting device as set forth in claim 17, wherein a planar side of the alignment element faces away from the optical system and a spherical side of the alignment element faces toward the optical system.

19. The optical sighting device as set forth in claim 16, wherein the manually operable control comprises at least one set screw.

20. The optical sighting device as set forth in claim 16, wherein each of the at least one set screw has a knob at one, end, the knob configured to allow a user to rotate the set screw to adjust the alignment element.

\* \* \* \* \*